US007652964B2

(12) United States Patent
Nozaki

(10) Patent No.: US 7,652,964 B2
(45) Date of Patent: Jan. 26, 2010

(54) OPTICAL DISK DEVICE

(75) Inventor: Koji Nozaki, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 468 days.

(21) Appl. No.: 11/802,991

(22) Filed: May 29, 2007

(65) Prior Publication Data

US 2007/0280076 A1 Dec. 6, 2007

(30) Foreign Application Priority Data

May 30, 2006 (JP) ............................. 2006-150043

(51) Int. Cl.
*G11B 27/36* (2006.01)
(52) U.S. Cl. ................................. 369/53.31; 369/47.53
(58) Field of Classification Search .............. 369/47.53, 369/47.55, 53.22, 53.31, 53.37, 30.36, 30.07, 369/30.09
See application file for complete search history.

(56) References Cited

U.S. PATENT DOCUMENTS

| 7,414,935 | B2 * | 8/2008 | Osakabe ................. 369/47.51 |
| 2006/0109763 | A1 * | 5/2006 | Yen et al. ................. 369/47.51 |

FOREIGN PATENT DOCUMENTS

JP 05-314730 11/1993

* cited by examiner

*Primary Examiner*—Thang V Tran
*Assistant Examiner*—Brenda Bernardi
(74) *Attorney, Agent, or Firm*—Pillsbury Winthrop Shaw Pittman, LLP

(57) ABSTRACT

An optical disk device includes a recording and reading means which performs recording of data upon, or reading of data from, an optical disk upon which are stored an ID, number of times information, and recording management information. Furthermore, when recording of data upon the optical disk has been completed, this optical disk device stores the recording management information, the number of times information, and the ID of the optical disk in a storage means in mutual correspondence. And, when the optical disk has been mounted, the recording and reading means decides whether a first situation or a second situation holds, using the ID and the number of times information of the optical disk as a key. And, if the second situation holds, the recording and reading means utilizes the recording management information in the storage means.

3 Claims, 4 Drawing Sheets

OPTICAL DISK DEVICE

CROSS REFERENCE

This Nonprovisional application claims priority under 35 U.S.C. § 119(a) on Patent Application No. 2006-150043 filed in Japan on May 30, 2006, the entire contents of which are hereby incorporated by reference.

BACKGROUND OF THE INVENTION

The present invention relates to mount processing for an optical disk device.

In the prior art, optical disk devices which replay video and audio recorded upon optical disks have been implemented in practice, and are generally widespread. As for optical disks, there are various types of recordable optical disk such as CD-R, DVD-R, DVD+R, DVD-RAM, CD-RW, DVD-RW, and the like, and also there are various types of replay-only optical disk such as CD-ROM, DVD-ROM, and the like. The recording region upon such a recordable type optical disk, from its internal circumference to its external circumference, is divided into: a PCA (Power Calibration Area) upon which calibration of the laser power is performed; a RMA (Recording Management Area) upon the optical disk in which recording management information necessary for the optical disk device is recorded; a lead-in region in which information data (hereinafter termed TOC data) about the data which is recorded in the data region upon the optical disk is recorded; a data region in which audio data or video data or the like is recorded; and a lead-out region in which data is created when finalization has taken place.

With a typical prior art type optical disk device, mount processing is performed automatically when the user has loaded an optical disk into the optical disk device. This mount processing is processing in which the optical disk device shifts a pickup head, so as to perform reading in of the data recorded in the RMA and in the lead-in region. And, when this mount processing ends, the optical disk device displays upon a display device a list of the files which are recorded upon this optical disk. These files may include video files or music files or the like. The user looks at the display device, and designates with an actuation unit, from this list of files, a file which he desires. When this has been done, the optical disk device performs replay of the file which has been designated.

It should be understood that, in Japanese Laid-Open Patent Publication Heisei 5-314730, there is proposed an optical disk device in which, in order to determine identity of optical disks, whether their TOC data agree is used as a decision reference (refer to Patent Document #1).

However, with the prior art type optical disk device described above, a long time period is required for reading in the recording management information which is recorded in the RMA. The main reason for this is because it is necessary to search for and read out the newest recording management information from within the RMA.

Due to this, with the prior art type optical disk device described above, a long time period has been required for mount processing. Accordingly, even after the optical disk has been loaded into the optical disk device, it has been necessary for the user to wait for a considerable time until the list of files is displayed. Thus, with the prior art type optical disk device described above, there has been the problem that the convenience of use from the point of view of the user has been bad.

The objective of the present invention is to provide an optical disk device with which the time period required for mount processing is shortened.

SUMMARY OF THE INVENTION

The optical disk device according to the present invention includes a recording and reading means which performs recording of data upon, or reading of data from, an optical disk which stores an ID, number of times information, and recording management information. With this structure, the ID is information which uniquely and individually identifies the optical disk. Moreover, the number of times information is information which specifies the number of times that calibration of laser power has been performed upon the optical disk. Here, this calibration of the laser power is performed when starting recording of the data. Finally, the recording management information is information which specifies the recording range of data upon the optical disk. Here, this recording management information is created and is recorded upon the optical disk, when recording of the data is completed.

Furthermore, this optical disk device includes a storage means which, when recording of data upon the optical disk has been completed, stores the recording management information, the number of times information, and the ID read from the optical disk by the recording and reading means in mutual correspondence.

And this recording and reading means includes a decision means which, when the optical disk has been mounted, reads the number of times information and the ID from the optical disk, and decides whether a first situation holds in which the ID and the number of times information which have been read are not stored in the storage means, or a second situation holds in which the ID and the number of times information which have been read are stored in the storage means.

And this recording and reading means performs the following operations, according to the result of this decision by the decision means:

(1) in the case of the first situation, it reads the recording management information from the optical disk, and performs recording of data upon the optical disk or reading of data therefrom, based upon the recording management information which has been read;

(2) in the case of the second situation, it reads the recording management information from the storage means, and performs recording of data upon the optical disk or reading of data therefrom, based upon the recording management information which has been read.

Since, in the case (2) described above, the recording and reading means is able to utilize the recording management information in the storage means, accordingly the reading of that recording management information from the optical disk may be omitted.

DETAILED DESCRIPTION OF THE INVENTION

Figure 1:
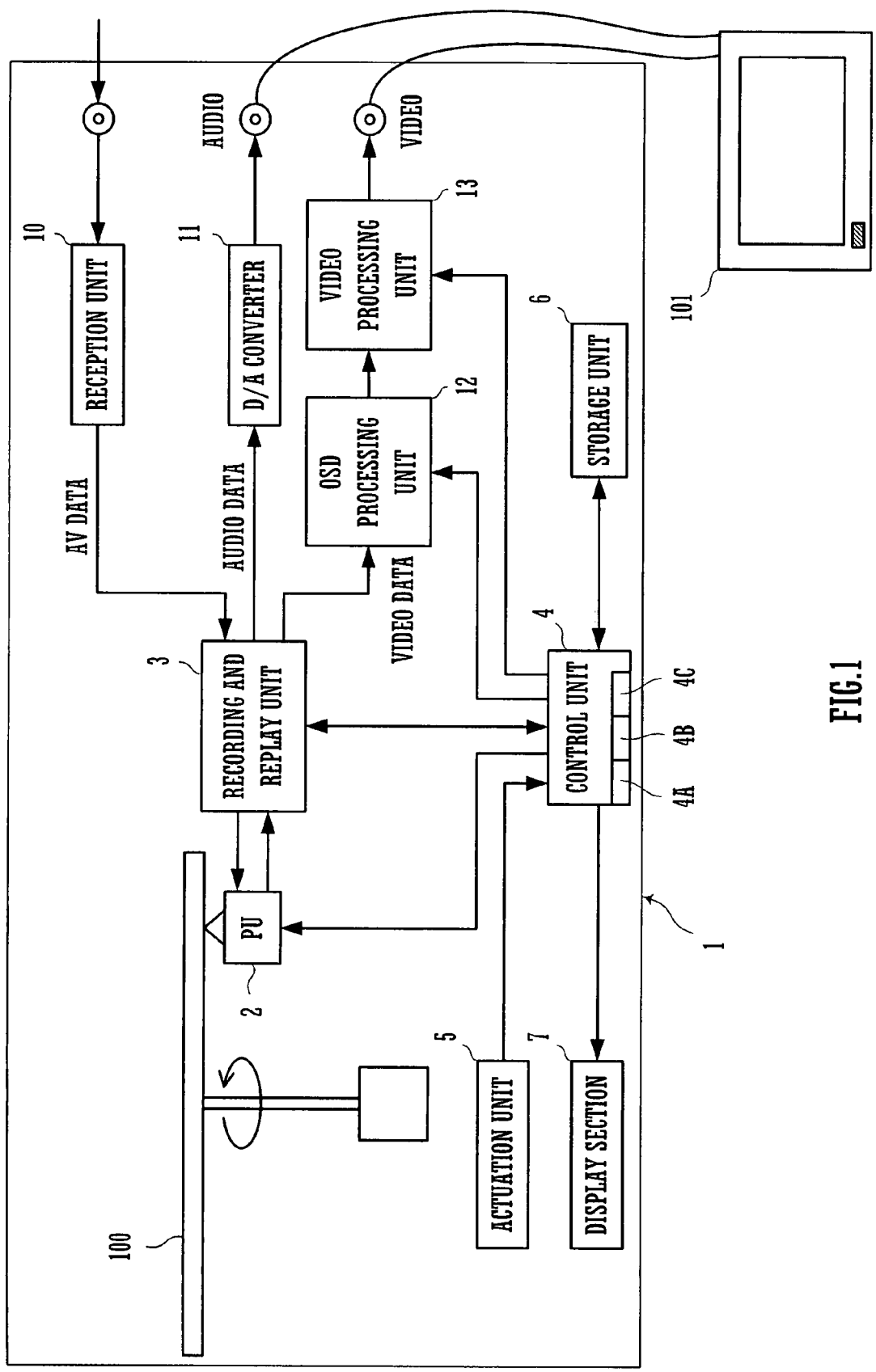
FIG. 1 is a block diagram showing the main structure of an optical disk device which is an embodiment of the present invention.

FIG. 1 is a block diagram showing the main structure of an optical disk device which is an embodiment of the present invention. This optical disk device 1 comprises: a control unit 4 which controls the optical disk device 1; a pickup head 2 (hereinafter termed the PU head 2) which performs recording of data upon an optical disk 100 and reading of data therefrom; a recording and replay unit 3 which comprises an RF amp and the like; an actuation unit 5 which receives input actuation from the user; a display section 7 which displays information; a storage unit 6 which stores data; a D/A converter 11 which converts audio data into an analog replay audio signal; a video processing unit 13 which converts video data into an analog replay video signal; and a reception unit 10 which acquires data by receiving a TV broadcast signal or the like. Furthermore, this optical disk device 1 also comprises a discharge mechanism not shown in the figures, which ejects the optical disk 100.

This optical disk device 1 is a so called DVD recorder. And the optical disk 100 may be, for example, a CD-R, a CD-RW, a DVD-R, a DVD+R, a DVD-RAM, a DVD-RW, or a DVD+RW.

The PU head 2 comprises a laser diode (LD), a collimator lens, a beam splitter, an objective lens, a photodetector, a thread motor, an actuator, and so on, none of which are shown in the drawings.

This PU head 2 is fitted upon a shaft which extends in the radial direction of the optical disk 100, so as to slide freely thereupon. And the thread motor shifts the PU head 2 in the radial direction of the optical disk 100.

The LD is a light source which outputs laser light. The photodetector comprises a plurality of light reception elements, and detects light reflected from the optical disk 100. On this photodetector, the light reception region is divided into, for example, four almost equal sections, so as to define four light reception regions.

The objective lens adjusts the position in which the laser light is irradiated upon the optical disk 100. Moreover, the actuator shifts the objective lens in the direction towards and away from the optical disk 100, and in the radial direction of the optical disk 100.

First, the operation during replay will be explained. The PU head 2 irradiates laser light of a certain reading power upon the optical disk 100, and detects the light reflected from the optical disk 100 with the photodetector. By doing this, the data recorded upon the optical disk 100 is optically read out.

The recording and replay unit 3 generates a RF signal based upon the outputs of the plurality of light reception elements in the PU head 2, and amplifies this RF signal. And the recording and replay unit 3 processes this RF signal and extracts and decodes the video data and the audio data therein. Here, the video data and the audio data which are extracted are encoded by, for example, MPEG or the like. And the recording and replay unit 3 outputs the audio data to the D/A converter 11 and the video data to the video processing unit 13, while maintaining synchronization between these two data streams.

The D/A converter 11 converts this audio data which has thus been expanded into an analog replay audio signal, and outputs this replay audio signal to an external television 101.

And the video processing unit 13 converts the video data which has been inputted into an analog replay video signal, which it likewise outputs to the external television 101.

This television 101 is connected to the D/A converter 11 and the video processing unit 13. Thus, with this television 101, the user is able to view video based upon the replay video signal outputted from the video processing unit 13, and to listen to audio based upon the replay audio signal outputted from the D/A converter 11.

It should be understood that, if the television 101 is compatible with digital signals, the signals may be outputted just as they are to this television 101 without being converted into analog form.

Next, the operation during recording will be explained.

The reception unit 10 is, for example, a tuner. This reception unit 10 extracts a TV broadcast signal upon a selected channel from an antenna which receives TV broadcasts and the like. And the reception unit 10 performs A/D conversion upon this TV broadcast signal and converts it into digital form, then outputting the result to the recording and replay unit 3. On the other hand, if contents such as the internet of a digital broadcast or the like is inputted as digital data, the reception unit 10 extracts data from the packets or the TV broadcast signal or the like. And the reception unit 10 outputs the result to the recording and replay unit 3.

And the recording and replay unit 3 encodes this data which has thus been inputted (for example by MPEG) and outputs the resulting digital signal to the PU head 2.

Moreover, when this digital signal from the recording and replay unit 3 is inputted, the PU head 2 controls laser light of a certain recording power according to this digital signal, and irradiates this laser light upon the recording surface of the optical disk 100.

The actuation unit 5 is a device for the user to input various types of command to the optical disk device 1. A plurality of keys are provided upon this actuation unit 5, including a replay key, a recording key, and an eject key. Commands which have been thus inputted to the optical disk device 1 are transmitted to the control unit 4.

This eject key is a key for commanding ejection of the optical disk 100.

The storage unit 6 consists of, for example, a hard disk or an EEPROM. This storage unit 6 stores a control program which specifies a control procedure for operation of the various sections of the optical disk device 1. Furthermore, the storage unit 6 also stores recording management information which is used for recording management of the optical disk 100, an ID which uniquely identifies the optical disk 100, and the number of times that calibration of the laser power has been performed upon the optical disk 100.

The display section 7 displays the current time, the setting state of the optical disk device 1, and the like.

The control unit 4 consists of, for example, a microcomputer. Furthermore, this control unit 4 incorporates a RAM (not shown in the figures) which serves as a working space for deployment of the above described control program and the like. The control unit 4 controls the various sections of the optical disk device 1 according to commands inputted to the optical disk device from the user.

Furthermore, the control unit 4 comprises a recording management generation unit 4A which performs recording management generation processing, a completion recording unit 4B which performs recording completion processing, and a decision unit 4C which performs decision processing. This recording management generation processing is processing for, when recording of data upon the optical disk 100 has been completed, creating recording management information and recording it upon the optical disk 100. Moreover, the recording completion processing is processing for, when recording of data upon the optical disk 100 has been completed, along with reading from the optical disk 100 its ID, its number of times information, and its recording management information, also recording this ID, this number of times information, and this recording management information in mutual correspondence in the storage unit 6. The number of times information is information which specifies the number of times that calibration of the laser power has been performed. Finally, the above described decision processing is processing for reading in the ID and the number of times information from the optical disk 100, and for deciding whether a first situation holds, in which this ID and this number of times information which have been read in from the optical disk 100 are not stored in the storage unit 6, or a second situation holds, in which this ID and this number of times information which have been read in from the optical disk 100 are stored in the storage unit 6.

Here, the PU head 2, the recording and replay unit 3, and the control unit 4 correspond to the "recording and reading means" of the Claims. Moreover, the storage unit 6 corresponds to the "storage means" of the Claims.

Figure 2:
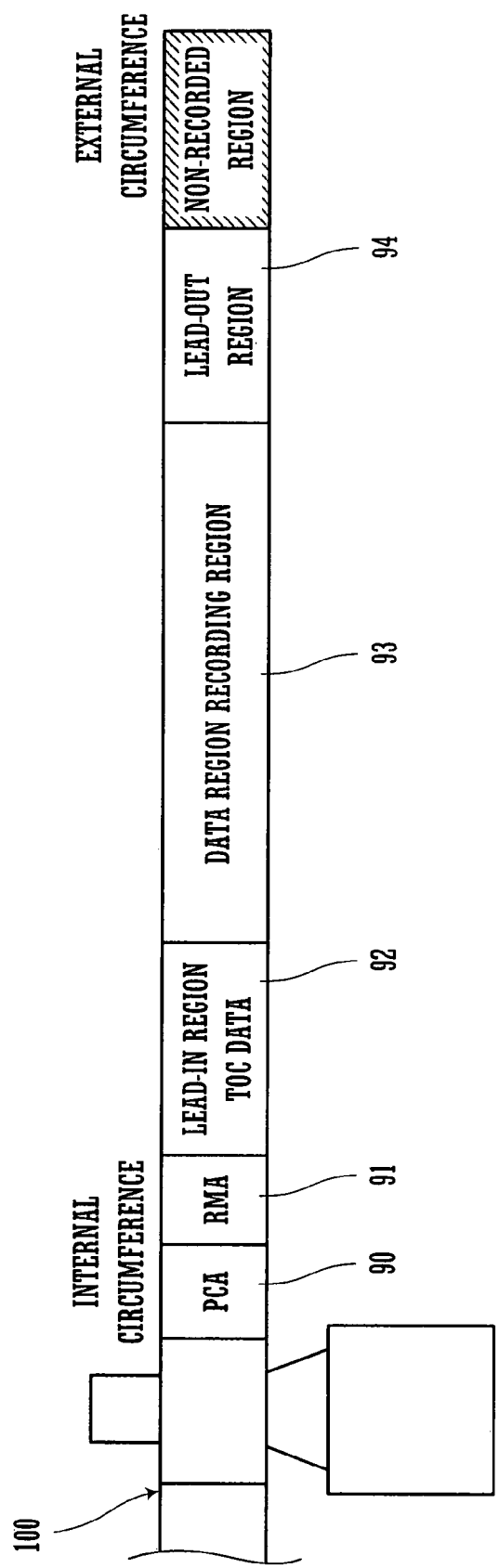
FIG. 2 is a figure showing the recording region upon an optical disk 100.

FIG. 2 is a figure showing the recording region upon the optical disk 100. From the inner circumference of this optical disk 100 towards its outer circumference, this recording region is divided into a PCA 90, a RMA 91, a lead-in region 92, a data region 93, and a lead-out region 94.

The PCA 90 is a region upon which calibration of the laser power is performed. For this, the optical disk device 1 acquires the number of times that calibration of the laser power has been performed by checking the PCA 90. This calibration of the laser power is performed when recording of data starts. According to the current standard, calibration of the laser power in this PCA can be performed a maximum of 99 times.

And the RMA 91 is a region in which information which is necessary for the optical disk device 1 to perform recording management is recorded. This recording management information is information which specifies the range upon the optical disk 100 in which data is recorded. By referring to this recording management information, the control unit 4 may ascertain, for example, up to what address upon the optical disk 100 the data is recorded.

The lead-in region 92 is a region in which TOC data for the data which is recorded in the data region 93 upon the optical disk 100 is recorded. Furthermore, the ID is recorded in advance in this lead-in region 92. This ID is information which uniquely and individually identifies the optical disk 100. This ID is, for example, a medium ID.

The data region 93 is a region in which the stored data is recorded.

And the lead-out region 94 is a region which is created when the stored data is finalized.

In the following, separate explanations will be provided for a first scenario when recording of data upon the optical disk 100 is terminated, and for a second scenario in which the optical disk has been mounted into the optical disk device 1.

First, the first scenario will be explained.

Figure 3:
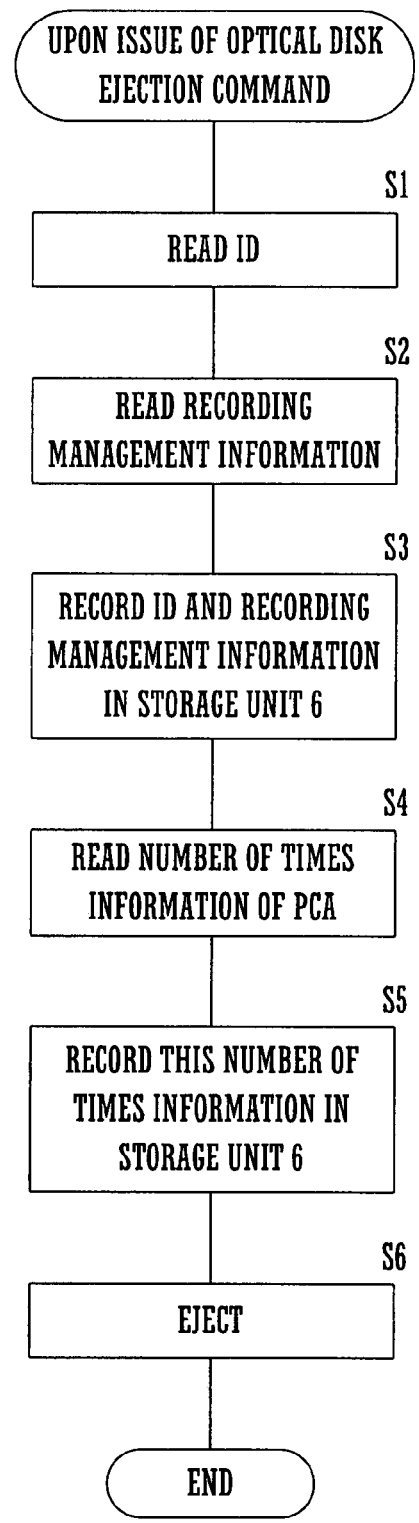
FIG. 3 is a flow chart showing the operations performed by a control unit of this optical disk device according to an embodiment of the present invention, when the optical disk device has been commanded to eject an optical disk.

FIG. 3 is a flow chart showing the operations performed by the control unit of this optical disk device according to an embodiment of the present invention, when the optical disk device has been commanded to eject an optical disk.

When recording of data upon the optical disk 4 has terminated, the control unit 4 executes recording management generation processing with the recording management generation unit 4A. As a result, the recording management generation unit 4A creates recording management information which indicates the range upon the optical disk 100 upon which data is recorded at this time, and commands the PU head 2 to record this information upon the optical disk 100. And, when ejection of the optical disk 100 is commanded with the actuation unit 5, the control unit 4 executes the following recording completion processing with the completion recording unit 4B.

It should be understood that although, in this embodiment, the recording completion processing is executed when ejection of the optical disk 100 has been commanded with the actuation unit 5, the present invention is not to be considered as being limited by this feature. It would also be acceptable, during implementation, for example, to execute the recording completion processing each time recording upon the optical disk 100 ends.

First, the control unit 4 reads the ID from the lead-in region 92 on the optical disk 100 with the PU head 2 (a step S1).

Next, the control unit 4 reads the recording management information from the RMA 91 on the optical disk 100 with the PU head 2 (a step S2). Here, the control unit 4 searches for the newest recording management information from the RMA 91 with the PU head 2, and reads it. This newest recording management information is positioned at the end of the RMA 91.

And the control unit 4 records the above described ID and recording management information in the storage unit 6 in mutual correspondence (a step S3). If the ID and the recording management information are already recorded in the storage unit 6, the control unit 4 performs recording updating according to the ID and the newest recording management information which have been read in the steps S2 and S2.

Next, the control unit 4 reads the number of times information, which indicates the number of times that calibration of the laser power has been performed, from the optical disk 100 with the PU head 2 (a step S4). In more detail, the control unit 4 finds, with the PU head 2, the boundary point in the PCA 90 between the region where calibration of the laser power has been performed, and the region where up until now such calibration has not been performed. By doing this, the control unit 4 is able to acquire the number of times information via the recording and replay unit 3.

And the control unit 4 records this number of times information which it has read in the storage unit 6, in correspondence with the above described ID (a step S5). In the same manner as in the step S3 described above, if the number of times information is already stored in the storage unit 6, then the control unit 4 updates this record with the newest number of times information which it has just read in this step S4.

Finally, the control unit 4 ejects the optical disk 100 with a discharge mechanism (not shown in the figures) (a step S6), and then this processing ends.

Due to the above, when the recording of data upon the optical disk 100 has been completed, the storage unit 6 contains the recording management information, the number of times information, and the ID, which have been read in from the optical disk 100, all in mutual correspondence.

Next, the second scenario will be explained.

Figure 4:
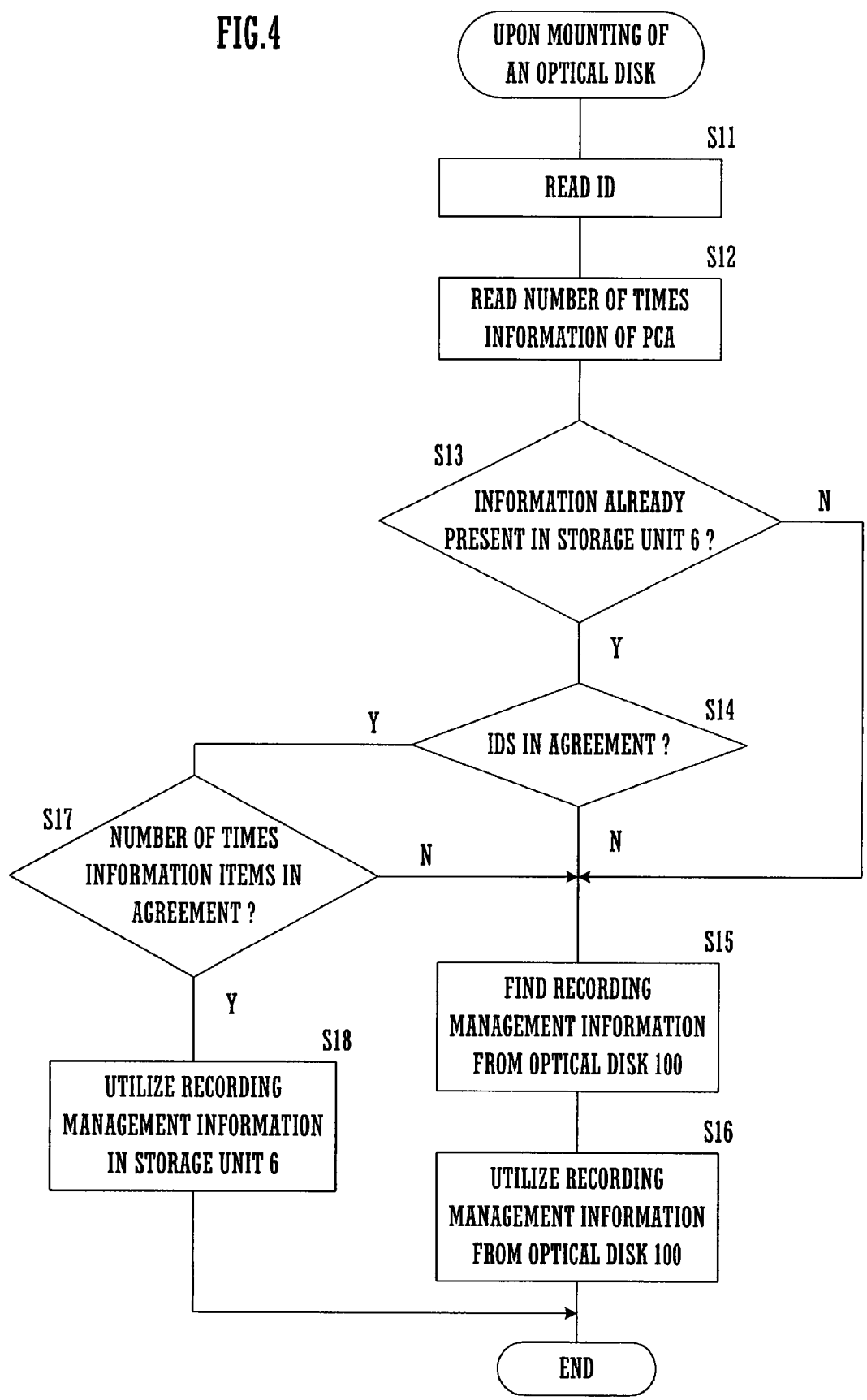
FIG. 4 is a flow chart showing the operations performed by this control unit, when an optical disk has been mounted to this optical disk device according to an embodiment of the present invention.

FIG. 4 is a flow chart showing the operations performed by the control unit 4, when an optical disk 100 has been mounted to this optical disk device 1 which is an embodiment of the present invention. Here, when the optical disk 100 has been mounted, is when the optical disk 100 has been loaded into the optical disk device 1, or when a replay command has been inputted in the state in which an optical disk is already loaded into the optical disk device 1, or the like. When the optical disk 100 is mounted, the control unit performs the following mount processing.

First, the control unit 4 reads in the disk control information from the lead-in region 92 of the optical disk 100 with the PU head 2 (a step S11). The above described ID and TOC data are included in this disk control information. And the control unit 4 acquires the ID which has thus been read in via the recording and replay unit 3.

Next, the control unit 4 reads in, with the PU head 2, the number of times information of the optical disk 100 from the PCA 90 of the optical disk 100 (a step S12). This processing is the same as that performed in the step S4.

The control unit 4 then decides (a step S13) whether or not this ID and number of times information are already recorded in the storage unit 6.

If the result of the decision in the step S13 is affirmative, then the control unit 4 decides (a step S14) whether or not the ID which has been read in from the optical disk 100 in the step S11 and the ID which is stored in the storage unit 6 agree with one another. Here, these two IDs agreeing with one another means that this optical disk 100 which is currently mounted is the same as an optical disk which was mounted at some previous time (especially at the previous time).

If the two IDs do agree with one another, then the control unit 4 makes a decision (a step S17) as to whether or not the number of times information which was read in from the optical disk 100 in the step S12 and the number of times information which is stored in the storage unit 6 agree with one another. Here, these two items of number of times information agreeing with one another means that, after the optical disk 100 mounted this time was ejected from this optical disk device the previous time, no data has been recorded upon it by any other optical disk device.

In other words, in the steps S14 and S17, the control unit 4 decides, with the decision unit 4C, whether a first situation holds in which the ID and the number of times information which have been read in from the optical disk 100 are not stored in the storage unit 6, or a second situation holds in which said ID and said number of times information which have been read in are stored in the storage unit 6. And if the result of the decision in the step S14 is affirmative and moreover the result of the decision in the step S17 is affirmative, this means that the optical disk 100 which is mounted at this time and an optical disk which was mounted at some previous time are the same, and moreover that the recording management information which is recorded upon the optical disk 100 which is mounted at this time and the recording management information which is stored in the storage unit 6 are the same information.

In the case of the first situation, the control unit 4 causes the PU head 2 to find the final end of the recording management information in the RMA 91 (a step S15). By this, the control unit 4 causes the PU head 2 to find the newest recording management information. Furthermore, this case of the first situation is, in concrete terms, when in the step S17 the two items of number of times information are not in agreement with one another, or when in the step S14 the two IDs do not agree with one another, or when in the step S13 the information is not present in the storage unit 6.

And the control unit 4 reads in and uses the recording management information from the optical disk 100 (a step S16), and then this processing terminates. As a result, this optical disk device 1 performs recording or reading of data to or from the optical disk 100, based upon the recording management information which has been read in from the optical disk 100.

On the other hand, if in the step S17 it has been decided that the two items of number of times information do agree with one another, in other words in the case of the second situation, then the control unit 4 utilizes the recording management information which corresponds to the agreeing IDs and which is stored in the storage unit 6 (a step S18), and then this processing terminates. As a result, this optical disk device 1 performs recording of data upon the optical disk or reading of data therefrom, based upon the recording management information which has been read in from the storage unit 6. Thus, in the step S18, the control unit 4 omits the reading of the recording management information from the optical disk 100 in the steps S15 and S16. Due to this, it is possible to shorten the time period which is required for the mount processing (in other words, the time period required for the steps S15 and S16). Accordingly, it is possible to enhance the convenience of use from the point of view of the user.

Furthermore, the following variant embodiments of the present invention may be employed.

It would also be acceptable to provide a changeover key upon the actuation unit 5, which changes over the completion recording unit 4B between being effective and being ineffective. And the control unit 4 makes the completion recording unit 4B ineffective if setting to the ineffective side has been performed via this changeover key. In other words, this changeover key is a key which changes over whether or not to store the recording management information, the number of times information, an the ID which have been read in from the optical disk 100 by the control unit 4, in correspondence with one another in the storage unit 6.

By doing this, the user is able to employ the changeover key to set whether recording completion processing (i.e. the recording termination function) is to be effective or ineffective.

In this variant embodiment, when the recording completion processing is made to be effective, it is possible to shorten the time period for mounting, in the same manner as described above. On the other hand, when the recording completion processing is set to be ineffective, then, in the first scenario, the performance of reading in and so on of the recording management information from the optical disk 100 is eliminated. In concrete terms since, when the ejection of the optical disk 100 has been commanded, the control unit 4 does not perform the processing for reading in the recording management information (i.e. the steps S1 through S5), accordingly the optical disk 100 is immediately ejected (in the step S6). Conversely, the mounting time period is not shortened.

Due to the above, it is possible for the user to select whether, according to the first scenario, to shorten the time period which is required from when the eject command is issued until this command is executed, or, according to the second scenario, to shorten the time period which is required for the mount processing, according to his own desired mode of user. To put this in another manner, the user is enabled to select, according to his own desired mode of use, whether to shorten the time period which is required for the steps S1 through S4, or to shorten the time period which is required for the steps S15 and S16.

Accordingly, the convenience of use from the point of view of the user can be enhanced by yet a further level.

In this variant embodiment, the actuation unit 5 corresponds to the "changeover means" of the Claims.

What is claimed is:

1. An optical disk device to which is mounted an optical disk upon which are stored an ID of said optical disk, number of times information which specifies the number of times that calibration of laser power has been performed upon said optical disk, and recording management information which specifies the recording range of data upon said optical disk, comprising:

a recording and reading means which performs recording of data upon, or reading of data from, said optical disk; and a storage means which, when recording of data upon said optical disk has been completed, stores said recording management information, said number of times information, and said ID read from said optical disk by said recording and reading means in mutual correspondence;

and wherein said recording and reading means:

comprises a decision means which, when said optical disk has been mounted, reads said number of times information and said ID from said optical disk, and decides whether a first situation holds in which said ID and said number of times information which have been read are not stored in said storage means, or a second situation holds in which said ID and said number of times information which have been read are stored in said storage means; and:

in the case of said first situation, reads said recording management information from said optical disk, and performs recording of data upon said optical disk or reading of data therefrom, based upon said recording management information which has been read; and in the case of said second situation, reads said recording management information from said storage means, and performs recording of data upon said optical disk or reading of data therefrom, based upon said recording management information which has been read.

2. An optical disk device as described in claim 1, wherein, when recording of data upon said optical disk has been completed, said storage means stores said recording management information, said number of times information, and said ID read from said optical disk by said recording and reading means in mutual correspondence, only when ejection of said optical disk has been commanded.

3. An optical disk device as described in claim 1, further comprising a changeover means which changes over whether, or not, said recording management information, said number of times information, and said ID read from said optical disk by said recording and reading means should be stored in said storage means in mutual correspondence.

* * * * *